US009760263B2

(12) United States Patent
Takeguchi et al.

(10) Patent No.: US 9,760,263 B2
(45) Date of Patent: Sep. 12, 2017

(54) IMAGE PROCESSING DEVICE, IMAGE PROCESSING METHOD, AND STEREOSCOPIC IMAGE DISPLAY DEVICE

(71) Applicant: KABUSHIKI KAISHA TOSHIBA, Tokyo (JP)

(72) Inventors: Tomoyuki Takeguchi, Kawasaki (JP); Nakaba Kogure, Zama (JP); Reiko Noda, Kawasaki (JP); Taichiro Shiodera, Tokyo (JP); Yoshiyuki Kokojima, Yokohama (JP)

(73) Assignee: Toshiba Medical Systems Corporation, Tokyo (JP)

( * ) Notice: Subject to any disclaimer, the term of this patent is extended or adjusted under 35 U.S.C. 154(b) by 0 days.

(21) Appl. No.: 14/191,755

(22) Filed: Feb. 27, 2014

(65) Prior Publication Data
US 2014/0340400 A1    Nov. 20, 2014

(30) Foreign Application Priority Data

May 14, 2013   (JP) .................................. 2013-102298

(51) Int. Cl.
*G06T 17/00*   (2006.01)
*G06F 3/0484*   (2013.01)
(Continued)

(52) U.S. Cl.
CPC ........ *G06F 3/04845* (2013.01); *G06F 3/0304* (2013.01); *G06F 3/0346* (2013.01);
(Continued)

(58) Field of Classification Search
None
See application file for complete search history.

(56) References Cited

U.S. PATENT DOCUMENTS 8,493,389 B2 *   7/2013   Olivan Bescos ... G06F 3/04815
                                                345/419
2011/0107270 A1*   5/2011   Wang .................. G06F 19/3437
                                                715/850

(Continued)

FOREIGN PATENT DOCUMENTS

JP    S62-209481 A    9/1987
JP    2008-077203 A    4/2008
(Continued)

OTHER PUBLICATIONS

Argelaguet et al.; "Visual feedback techniques for virtual pointing on stereoscopic displays"; 2009; VRST '09 Proceedings of the 16th ACM symposium on Virtual Reality Software and Technology; p. 163-170.*

(Continued)

*Primary Examiner* — Peter Hoang
(74) *Attorney, Agent, or Firm* — Finnegan, Henderson, Farabow, Garrett & Dunner, L.L.P.

(57) ABSTRACT

According to an embodiment, an image processing device includes a receiver, a determiner, and a generator. The receiver is configured to receive a three-dimensional position in a coordinate system of three-dimensional data including an object. The determiner is configured to determine placement of a three-dimensional pointer having a first 3D shape and a second 3D shape positioned around the first 3D shape so that a position of the first 3D shape corresponds to the received three-dimensional position. The generator is configured to generate a stereoscopic image representing the three-dimensional pointer and the object.

15 Claims, 12 Drawing Sheets

(51) Int. Cl.
*G06F 3/03* (2006.01)
*G06F 3/0346* (2013.01)
*G06F 3/0354* (2013.01)
*H04N 13/00* (2006.01)
*H04N 13/04* (2006.01)

(52) U.S. Cl.
CPC ..... *G06F 3/03545* (2013.01); *H04N 13/0014* (2013.01); *H04N 13/04* (2013.01)

(56) References Cited

U.S. PATENT DOCUMENTS

2012/0013607 A1* 1/2012 Lee ............................... 345/419
2012/0062558 A1* 3/2012 Lee ....................... G06F 3/017
  345/419

FOREIGN PATENT DOCUMENTS

| JP | 2012-105048 A | 5/2012 |
| JP | 2012-173865 | 9/2012 |

OTHER PUBLICATIONS

Notification of Reasons for Refusal dated Mar. 7, 2017, in counterpart Japanese Patent Application No. 2011-102298 and machine translation, 5 pages.
Notification of Reasons for Refusal dated Mar. 30, 2017, in counterpart Japanese Patent Application No. 2013-102298.

* cited by examiner

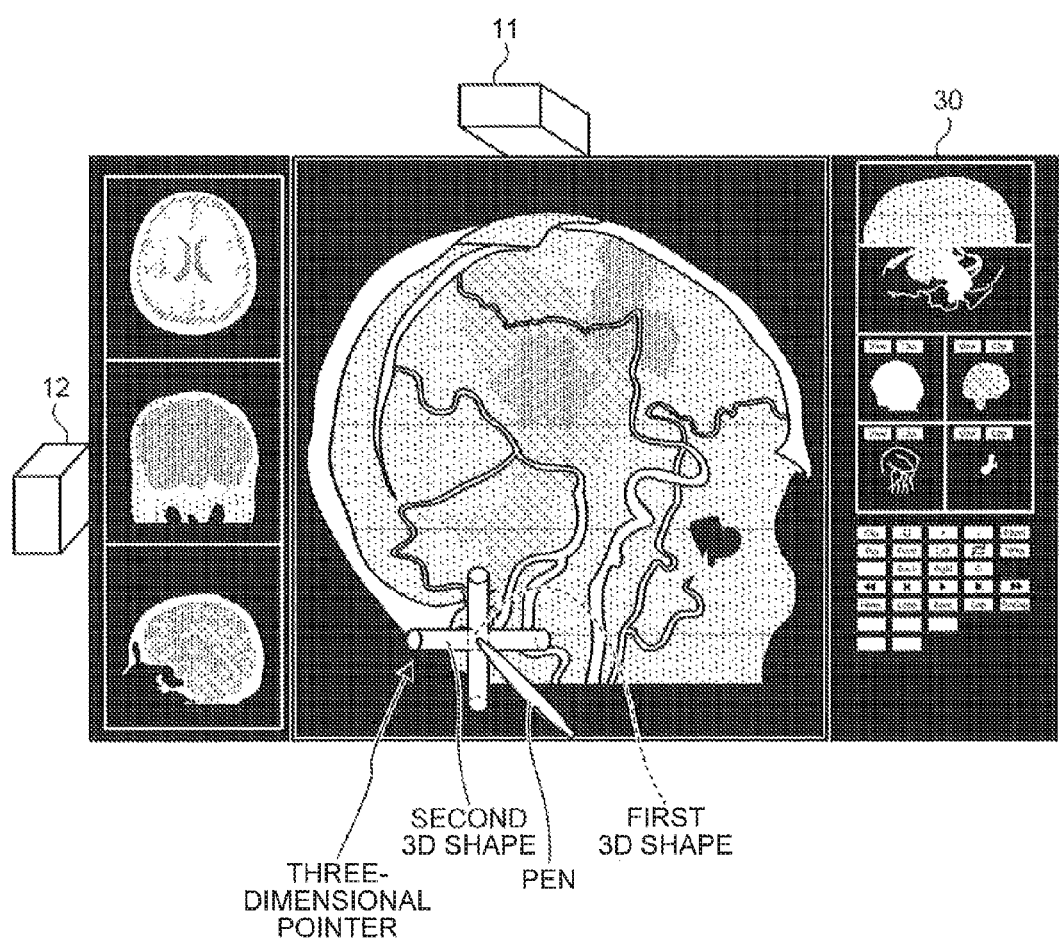

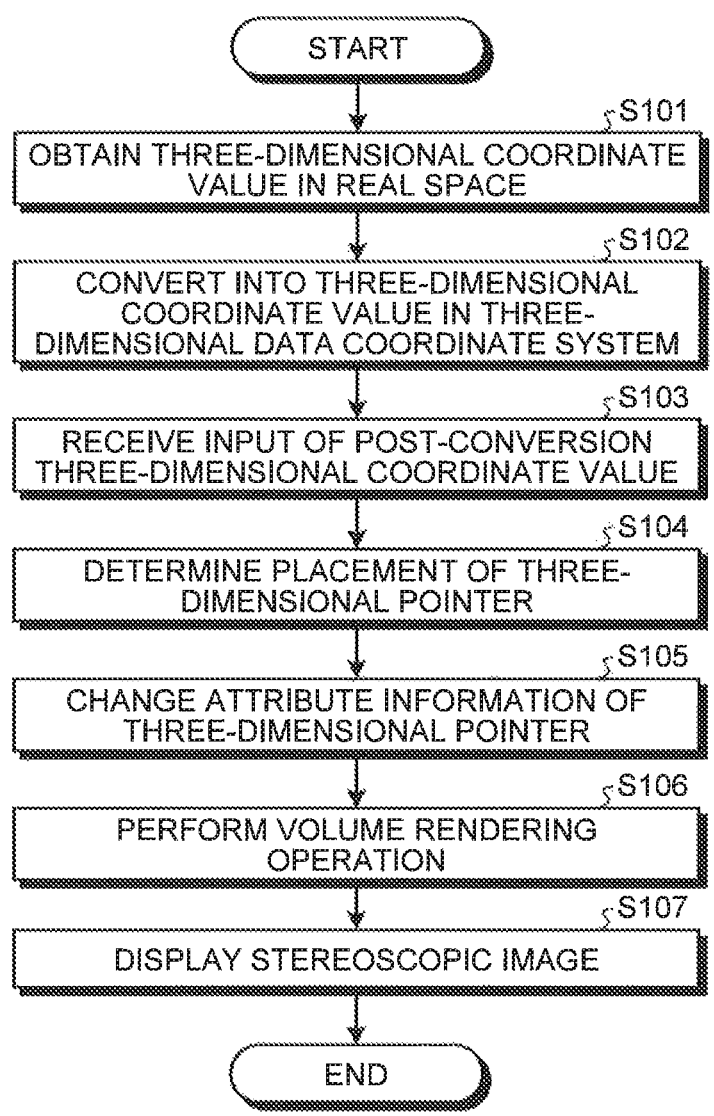

IMAGE PROCESSING DEVICE, IMAGE PROCESSING METHOD, AND STEREOSCOPIC IMAGE DISPLAY DEVICE

CROSS-REFERENCE TO RELATED APPLICATIONS

This application is based on and claims the benefit of priority from Japanese Patent Application No. 2013-102298, filed on May 14, 2013; the entire contents of which are incorporated herein by reference.

FIELD

Embodiments described herein relate generally to an image processing device, an image processing method, and a stereoscopic image display device.

BACKGROUND

A technology is known in which a pointer represented by the shape of an arrow or the like is displayed in a superimposed manner on a 3D image (a stereoscopic image) and is used to instruct an arbitrary position in the 3D image. For example, in JP-A 2012-173865, a technology is disclosed in which the pointer display position in a left parallax image and the pointer display position in a right parallax image are shifted according to the parallax at a position in the depth direction of a virtual space that is used for the purpose of stereoscopic display.

However, in the conventional technology, appearance resulting from the relative positional relationship between an object (a target for viewing) and the pointer cannot be presented with accuracy. For that reason, it is difficult for a viewer to accurately figure out the pointing position.

BRIEF DESCRIPTION OF THE DRAWINGS

FIG. 10 is a diagram illustrating a display example of a stereoscopic image according to the embodiment;

FIG. 11 is a flowchart for explaining an example of operations performed in the image processor according to the embodiment;

DETAILED DESCRIPTION

According to an embodiment, an image processing device includes a receiver, a determiner, and a generator. The receiver is configured to receive a three-dimensional position in a coordinate system of three-dimensional data including an object. The determiner is configured to determine placement of a three-dimensional pointer having a first 3D shape and a second 3D shape positioned around the first 3D shape so that a position of the first 3D shape corresponds to the received three-dimensional position. The generator is configured to generate a stereoscopic image representing the three-dimensional pointer and the object.

An exemplary embodiment of an image processing device, an image processing method, a computer program product, and a stereoscopic image display device according to the invention is described below in detail with reference to accompanying drawings.

In the stereoscopic image display device according to the embodiment, it is possible to implement a 3D display method such as the integral imaging method (II method) or the multi-view method. Examples of the stereoscopic image display device include a television (TV), a personal computer (PC), a smartphone, or a digital photo frame that enables a viewer to view a stereoscopic image with the unaided eye. Herein, a stereoscopic image points to an image that includes a plurality of parallax images having mutually different parallaxes. The parallaxes represent the differences in appearance resulting from the different directions of viewing. Meanwhile, in the embodiment, an image can either be a still image or be a dynamic picture image.

Figure 1:
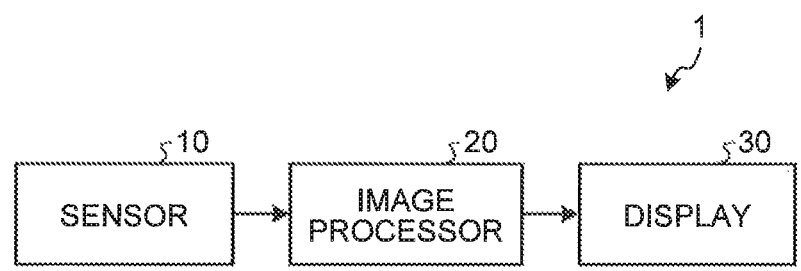
FIG. 1 is a diagrammatic illustration of a stereoscopic image display device according to an embodiment.

FIG. 1 is a block diagram illustrating an overall functional configuration or a stereoscopic image display device 1 according to the embodiment. The stereoscopic image display device 1 includes a sensor 10; an image processor 20 that generates stereoscopic images; and a display 30 that displays thereon stereoscopic images.

Figure 2:
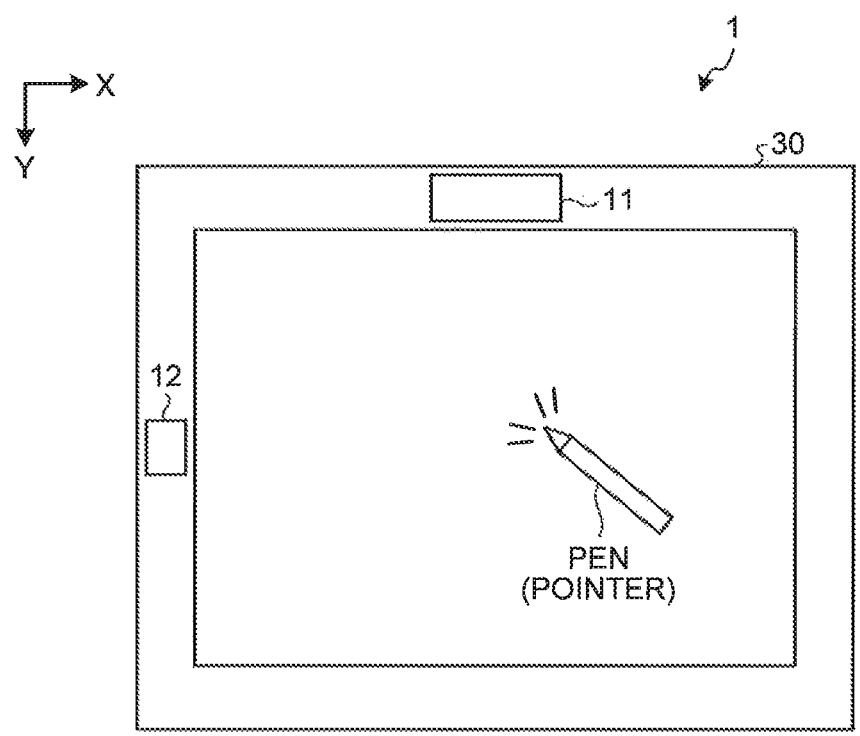
FIG. 2 is a front view of a display according to the embodiment.
Figure 3:
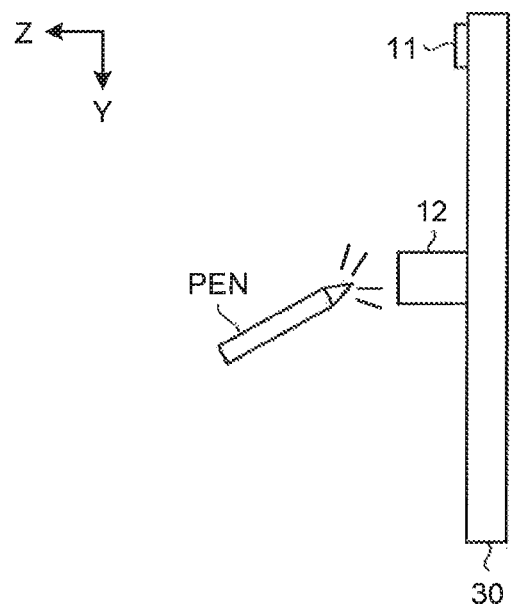
FIG. 3 is a side view of the display according to the embodiment.

The sensor 10 detects the position (the three-dimensional coordinate value) of an pointer (such as a finger or a pen) in the real space on the near side of a screen of the display 30 on which stereoscopic images are displayed; and sends the detected three-dimensional coordinate value to the image processor 20. FIG. 2 is a front view of the display 30, and FIG. 3 is a side view of the display 30. As illustrated in FIGS. 2 and 3, the sensor 10 includes a first detecting unit 11 and a second detecting unit 12. Meanwhile, in the embodiment, a pen capable of emitting sound waves and infrared light from the tip section is used as the pointer for the purpose of indicating a position in the real space. However, that is not the only possible case.

The first detecting unit 11 detects the position of the pen in the X-Y plane in the real space illustrated in FIG. 2. More particularly, the first detecting unit 11 detects the sound waves and the infrared light emitted from the pen, and calculates the coordinate value of the pen in the X-axis direction and the coordinate value of the pen in the Y-axis direction on the basis of the time difference between the time taken by the sound waves to reach the first detecting unit 11 and the time taken by the infrared light to reach the first detecting unit 11. The second detecting unit 12 detects the position of the pen in the Z-axis direction in the real space illustrated in FIG. 3. In an identical manner to the first detecting unit 11, the second detecting unit 12 detects the sound waves and the infrared light emitted from the pen, and calculates the coordinate value of the pen in the Z-axis direction on the basis of the time difference between the time taken by the sound waves to reach the second detecting unit 12 and the time taken by the infrared light to reach the second detecting unit 12.

However, that is not the only possible case. Alternatively, for example, the configuration can be such that the pen emits either only the sound waves or only the infrared light from the tip section. In this case, the first detecting unit 11 can detect the sound waves (the infrared light) emitted from the pen, and can calculate the coordinate value of the pen in the X-axis direction and the coordinate value of the pen in the Y-axis direction on the basis of the time taken by the sound waves (or the infrared light) to reach the first detecting unit 11. In an identical manner, the second detecting unit 12 can detect the sound waves (or the infrared light) emitted from the pen, and can calculate the coordinate value of the pen in the Z-axis direction on the basis of the time taken by the sound waves (or the infrared light) to reach the second detecting unit 12.

Meanwhile, the configuration of the sensor 10 is not limited to the details given above. In essence, as long as the sensor 10 can detect the position of an pointer in the real space, it serves the purpose. Besides, the type of the pointer is also not limited to a pen. For example, a finger of the viewer can serve as the pointer, or a surgical knife or a scissor can serve as the pointer.

Figure 4:
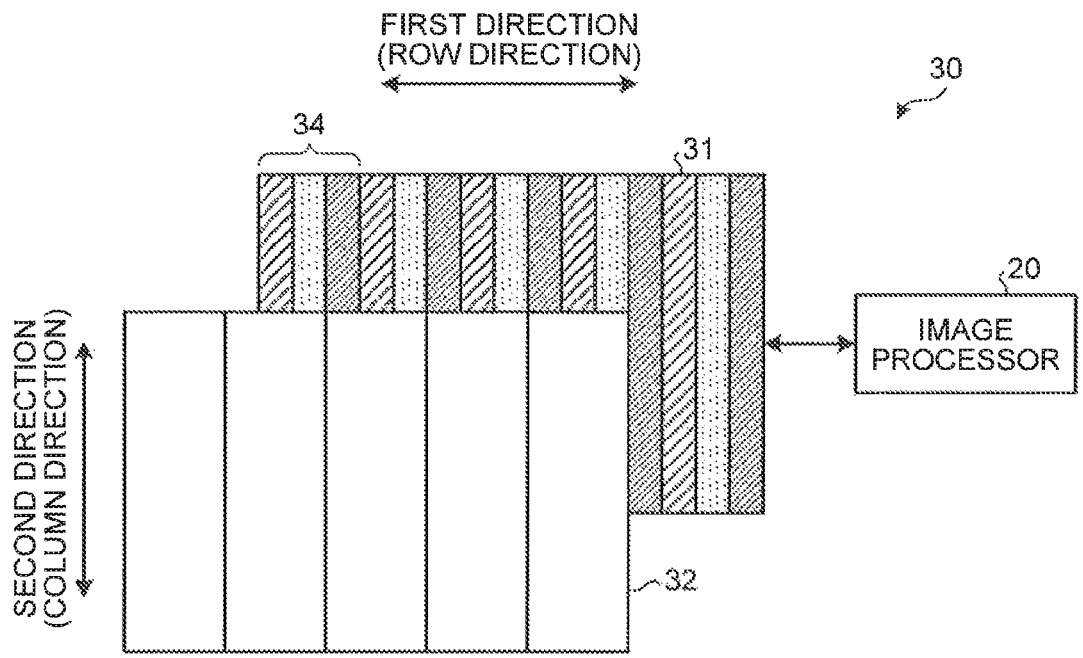
FIG. 4 is a diagram illustrating a configuration example of the display according to the embodiment.

Given below is the explanation of a configuration of the display 30. FIG. 4 is a diagram illustrating a configuration example of the display 30. As illustrated in FIG. 4, the display 30 includes a display element 31 and an aperture controller 32. When a viewer views the display element 31 via the aperture controller 32, he or she becomes able to view the stereoscopic image being displayed on the display 30, The display element 31 displays thereon the parallax images that are used in displaying a stereoscopic image. As far as the display element 31 is concerned, it is possible to use a direct-view-type two-dimensional display such as an organic electro luminescence (organic EL), a liquid crystal display (LCD), a plasma display panel (PDP), or a projection-type display. The display element 31 can have a known configuration in which, for example, a plurality of sub-pixels having red (R), green (G), and blue (B) colors is arranged in a matrix-like manner in a first direction (for example, the row direction with reference to FIG. 4) and a second direction (for example, the column direction with reference to FIG. 4). In the example illustrated in FIG. 4, a single pixel is made of RGB sub-pixels arranged in the first direction. Moreover, en image that is displayed on a group of pixels, which are adjacent pixels equal in number to the number of parallaxes and which are arranged in the first direction, is called an element image 34. Meanwhile, any other known arrangement of sub-pixels can also be adopted in the display element 31. Moreover, the sub-pixels are not limited to the three colors of red (R), green (G), and blue (B). Alternatively, for example, the sub-pixels can also have four colors.

The aperture controller 32 shoots the light beams, which are anteriorly emitted from the display element 31, toward a predetermined direction via apertures (hereinafter, apertures having such a function are called optical apertures). Examples of the aperture controller 32 include a lenticular sheet, a parallax barrier, and a liquid crystalline GRIN lens. The optical apertures are arranged corresponding to the element images of the display element 31.

Figure 5:
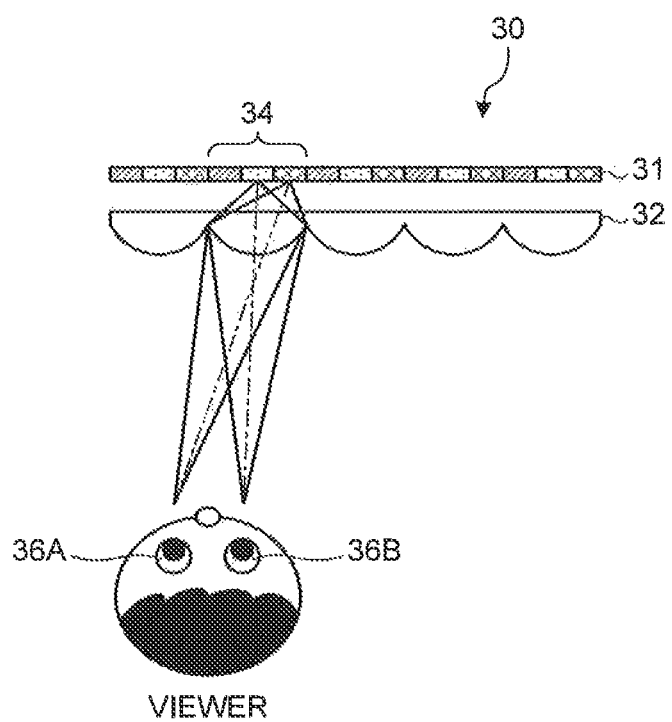
FIG. 5 is a schematic diagram illustrating a situation in which a viewer is viewing the display according to the embodiment.

FIG. 5 is a schematic diagram illustrating a situation in which a viewer is viewing the display 30. When a plurality of element images 34 is displayed on the display element 31, a parallax image group corresponding to a plurality of parallax directions gets displayed (i.e., a multiple parallax image gets displayed) on the display element 31. The light beams coming out from this multiple parallax image pass through the optical apertures. Then, the pixels included in the element images 34 and viewed by the viewer with a left eye 36A are different than the pixels included in the element images 34 and viewed by the viewer with a right eye 36B. In this way, when images having different parallaxes are displayed with respect to the left eye 36A and the right eye 36B of the viewer, it becomes possible for the viewer to view stereoscopic images. Moreover, the range within which the viewer is able to view stereoscopic images is called the visible region.

In the embodiment, the aperture controller 32 is disposed in such a way that the extending direction of the optical apertures thereof is consistent with the second direction (the column direction) of the display element 31. However, that is not the only possible case. Alternatively, for example, the configuration can be such that the aperture controller 32 is disposed in such a way that the extending direction of the optical apertures thereof has a predetermined tilt with respect to the second direction (the column direction) of the display element 31 (i.e., the configuration of a slanted lens).

Figure 6:
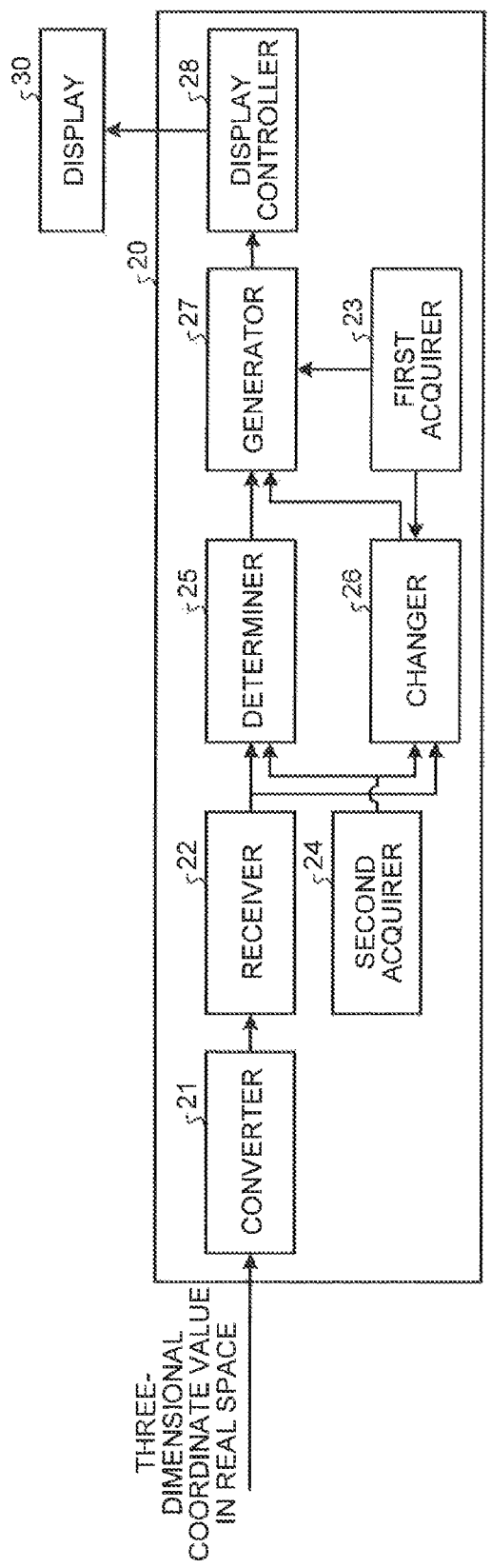
FIG. 6 is a diagram illustrating an exemplary functional configuration of an image processor according to the embodiment.

Given below is she explanation of the image processor 20. In this example, the image processor 20 corresponds to an "image processing device" mentioned in claims. FIG. 6 is a diagram illustrating a configuration example of the image processor 20. As illustrated in FIG. 6, the image processor 20 includes a converter 21, a receiver 22, a first acquirer 23, a second acquirer 24, a determiner 25, a changer 26, a generator 27, and a display controller 28.

In the embodiment, the image processor 20 has the hardware configuration of a commonly-used computer device that includes a central processing unit (CPU), a read only memory (ROM), a random access memory (RAM), and a communication I/F device. The functions of abovementioned constituent elements (i.e., the converter 21, the receiver 22, the first acquirer 23, the second acquirer 24, the deteterminer 25, the changer 26, the generator 27, and the display controller 28) are implemented when the CPU loads computer programs, which are stored in the ROM, in the RAM and runs them. However, that is not the only possible case. Alternatively, at least some of the functions of the constituent elements can be implemented using a dedicated hardware circuit. For example, at least the receiver 22, the determiner 25, and/or the generator 27 may be configured from a semiconductor integrated circuit. Given below is the explanation of the functions of each constituent element of the image processor 20.

Every time a three-dimensional coordinate value (i.e., a three-dimensional coordinate value in threat space as indicated by an pointer) is acquired from the sensor 10, the converter 21 converts that three-dimensional coordinate value into a three-dimensional coordinate value in a three-dimensional data coordinate system that forms the basis of a stereoscopic image generated by means of volume data rendering (described later); and then inputs the post-conversion three-dimensional coordinate value to the receiver 22.

Herein, the three-dimensional data points to the data that enables expressing the shape of a three-dimensional object, and may contain a space division, model or a boundary representation model. The space division model indicates a model in which, for example, the space is divided in a reticular pattern, and a, three-dimensional object is expressed using the divided grids. The boundary representation model indicates a model in which, for example, a three-dimensional object is expressed by representing the boundary of region covered by the three-dimensional object in the space. In the embodiment, the explanation is given for an example in which the three-dimensional data points to volume data. However, that is not the only possible case.

The receiver 22 receives a three-dimensional position in the three-dimensional data coordinate system. In this example, the receiver 22 receives a three-dimensional coordinate value from the converter 21.

Figure 7:
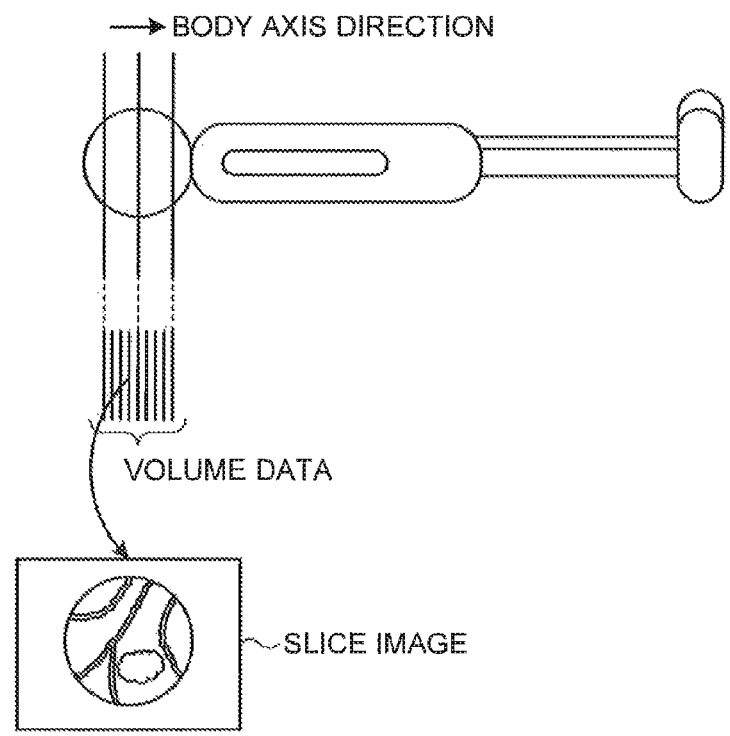
FIG. 7 is a schematic diagram for explaining volume data according to the embodiment.

The first acquirer 23 acquires three-dimensional data including a target for viewing (which corresponds to an "object" in claims). For example, the first acquirer 23 can acquire the three-dimensional data including the target for viewing from a database or can acquire the three-dimensional data including the target for viewing from a server device by accessing the server device. In the embodiment, as illustrated in FIG. 7; medical volume data, which is a set of a plurality of slice images (cross-sectional images) taken along the body axis direct ion of a subject being tested using an X-ray CT device or an MRI device, is considered to be the three-dimensional data including the target for viewing. The first acquirer 23 can also acquire the value of each voxel for example, the luminance value or the α value (the degree of transparency)) that constitutes the volume data including the target for viewing. Alternatively, for example, in each slice image constituting the volume data, if division of regions is done according to the body parts such as blood vessels/tumors/brain tissues; then the first acquirer 23 can also acquire information (for example, a label number assigned to each region) that enables identification of each region.

The second acquirer 24 acquires a three-dimensional pointer that is used to indicate any one position of the target for viewing. For example, the second acquirer 24 can acquire the three-dimensional pointer from a database or can acquire the three-dimensional pointer from a server device by accessing the server device. The three-dimensional pointer is expressed in the form of three-dimensional data. In this example, the second acquirer 24 can also acquire the value of each voxel constituting the three-dimensional pointer.

The three-dimensional pointer includes a first 3D shape and includes a second 3D shape that is formed around the first 3D shape. More particularly, with the first 3D shape serving as the center, the second 3D shape has the shape that extends in at least two different directions. In the embodiment, the three-dimensional pointer is made up of a plurality of sets of columnar three-dimensional data (or a plurality of set of cylindrical three-dimensional data or a plurality of set of prismatic three-dimensional data). Then, from among a plurality of sets of columnar three-dimensional data, such a region which includes the position of the center of gravity (center position) of each of a plurality of sets of columnar three-dimensional data and which is the region having the intersection of a plurality of sets of columnar three-dimensional data represents the first 3D shape; and the region other than the first 3D shape represents the second 3D shape. Herein, the position of center of gravity of each columnar shape indicates the same position.

Figure 8:
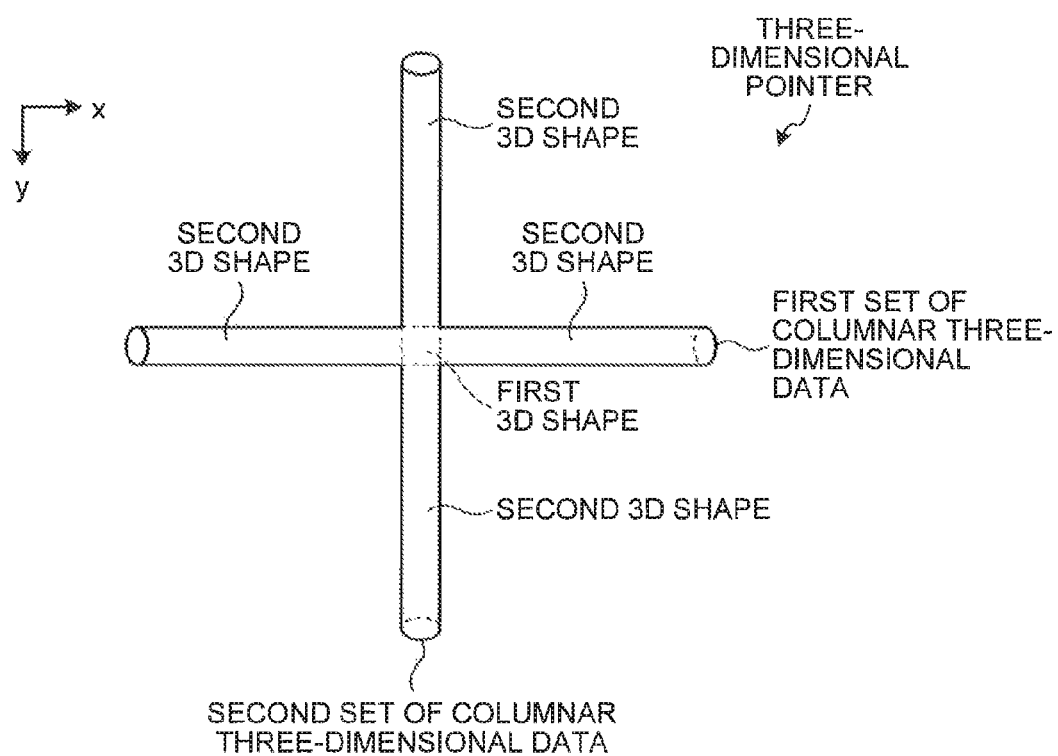
FIG. 8 is a diagram illustrating an example of a three-dimensional pointer according to the embodiment.

FIG. 8 is a diagram illustrating an example of the three-dimensional pointer according to the embodiment. The three-dimensional pointer illustrated in FIG. 8 is made up of a first set of columnar three-dimensional data (in this example, cylindrical three-dimensional data), which extends in the x-direction illustrated in FIG. 8 (i.e., extends in the horizontal, direction of the three-dimensional data coordinate system), and a second set of columnar three-dimensional data (in this example, cylindrical three-dimensional data), which extends in the y-direction illustrated in FIG. 8 that is orthogonal to the x-direction (i.e., extends in the vertical direction of the three dimensional data coordinate system). Of the first set of columnar three-dimensional data and the second set of columnar three-dimensional data, such a region which includes the position of the center of gravity of the two sets of three-dimensional data and which is the region having the intersection of the two sets of three-dimensional data represents the first 3D shape; and the region other than the first 3D shape represents the second 3D shape. Meanwhile, the configuration of the three-dimensional pointer is not limited, to the example illustrated in FIG. 8.

Figure 9A:
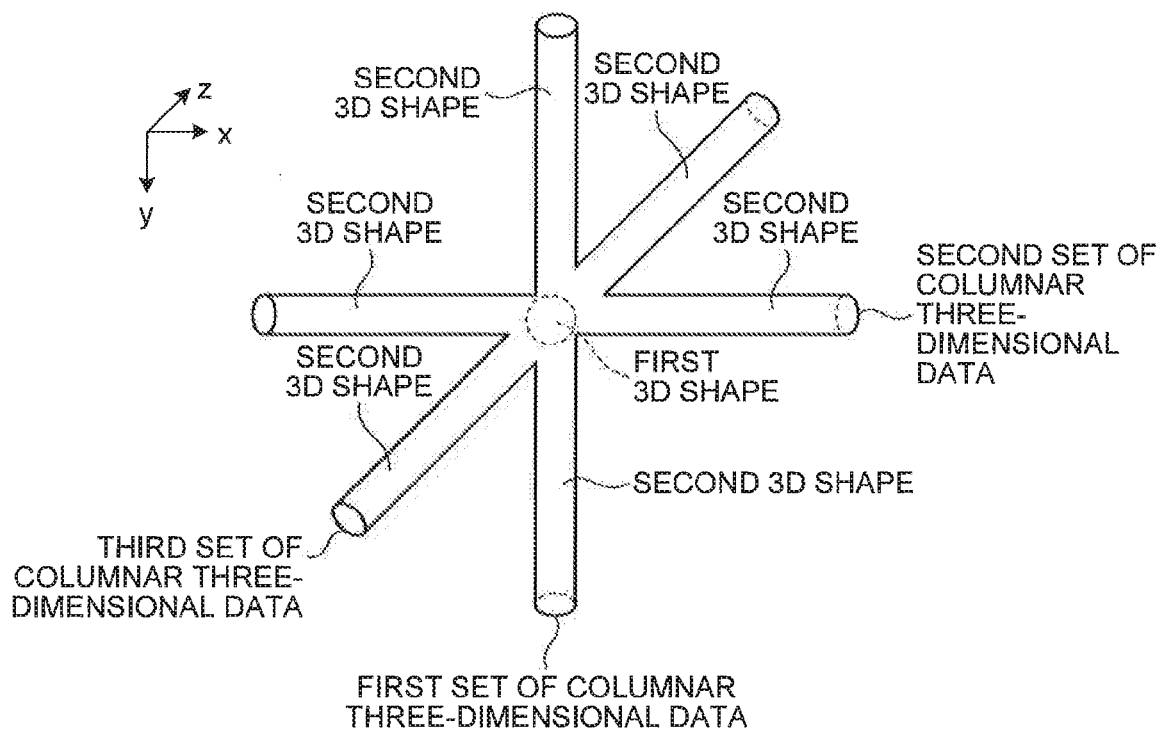
FIG. 9A is a diagram illustrating an example of the three-dimensional pointer.

Alternatively, for example, as illustrated in FIG. 9A, the three-dimensional data can be made up of the abovementioned first set of columnar three-dimensional data; the above mentioned second set of columnar three-dimensional data; and a third set of columnar three-dimensional data (in this example, cylindrical three-dimensional data) that extends in the z-direction which is orthogonal to the x-direction and the y-direction (i.e., extends in the depth direction of the three-dimensional data coordinate system). In the example illustrated in FIG. 9A, from among the first to third sets of columnar three-dimensional data, such a region which includes the position of the center of gravity of the first to third sets of columnar three-dimensional data and which lathe region having the intersection of the first to third sets of columnar three-dimensional data represents the first 3D shape; and the region other than the first 3D shape represents the second 3D shape.

Figure 9B:
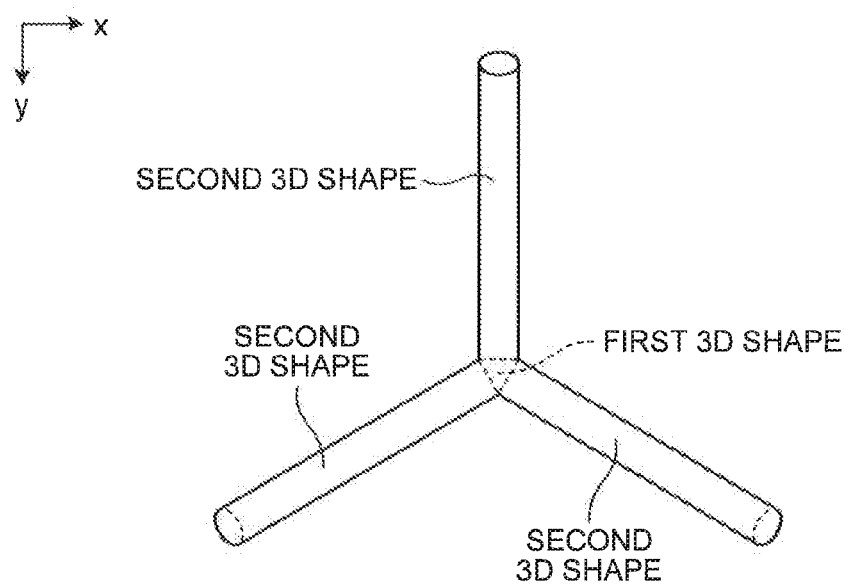
FIG. 9B is a diagram illustrating another example of the three-dimensional pointer.

Alternatively, for example, as illustrated in FIG. 9B, the three-dimensional pointer can be made up of three sets of columnar three-dimensional data (in the example, cylindrical three-dimensional data) extending in mutually different directions in the xy plane. In the example illustrated in FIG. 9B, from among the three sets of columnar three-dimensional data such a region which includes the position of the center of gravity of the three sets of columnar three-dimensional data and which is the region having the intersection of three sets of columnar three-dimensional data represents the first 3D shape; and the region other than the first 3D shape represents the second 3D shape.

Returning to the explanation with reference to FIG. 6, the determiner 25 determines the placement of the three-dimensional pointer in such a way that the first 3D shape included in the three-dimensional pointer is positioned at the three-dimensional position received by the receiver 22. In the embodiment, the determiner 25 determines the placement of the three-dimensional pointer in such a way that the first 3D shape, which is included in the three-dimensional pointer acquired by the second acquirer 24, is positioned at the three-dimensional coordinate value received from the converter 21 by the receiver 22. That is, the position of the three-dimensional pointer, which is the target for volume rendering (described later), is determined in a variable manner according to the position in the real space indicated by the viewer using a pen.

The changer 26 changes at least either the shape, or the color, or the degree of transparency of the three-dimensional pointer according to the information of the three-dimensional data corresponding to the three-dimensional position received by the receiver 22. In the following explanation, the information indicating the shape, the color, and the degree of transparency of the three-dimensional pointer is sometimes referred to as attribute information. Herein, for example, the changer 26 can change the color of the three-dimensional pointer according to the value of the vowel, that, from among the voxels acquired by the first acquirer 23 (i.e., from among the voxels constituting the volume data including the target for viewing), corresponds to the three-dimensional coordinate value received from the converter 21 by the receiver 22. The concrete explanation thereof is given below.

For example, consider a case in which, from among the vowels constituting the volume data including the target for viewing, the vowel that corresponds to the three-dimensional coordinate value received by the receiver 22 is included in a vowel group constituting "blood vessels". In this example, in case the three-dimensional pointer that is used in indicating "blood vessels" as the target for viewing has the same color to the color of "blood vessels", then it becomes difficult to understand the position indicated by the three-dimensional pointer. In that regard, according to the embodiment, the changer 26 changes the color of the three-dimensional pointer to a different color than the color indicated by the value of the voxel that, from among the voxels constituting the volume data including the target for viewing, corresponds to the three-dimensional coordinate value received by the receiver 22. As a result, it becomes possible to distinctly identify the position indicated by the three-dimensional pointer.

However, that is not the only possible case. Alternatively, for example, when the voxel that, from among the voxels constituting the volume data including the target for viewing, corresponds to the three-dimensional coordinate value received by the receiver 22 is included in a voxel group constituting any one of "blood vessels", "tumors", and "brain tissues"; the changer 26 can make a change so as to extend the columnar portions of the three-dimensional pointer so that the three-dimensional pointer does not remain completely hidden.

Still alternatively, for example, when the voxel that, from among the voxels constituting the volume data including the target for viewing, corresponds to the three-dimensional coordinate value received by the receiver 22 is positioned on the near side (on the side of the viewer); the changer 26 can make a change so as to increase the degree of transparency of the three-dimensional pointer so that it becomes easier to view the region of the volume data including the target for viewing that is on the far side of the three-dimensional pointer.

Given below is the explanation about the generator 27 illustrated in FIG. 6. The generator 27 generates a stereoscopic image representing the three-dimensional pointer and the target (object) for viewing. More particularly, the generator 27 performs rendering of the three-dimensional pointer along with (together with) the three-dimensional data including the target for viewing, and generates the stereoscopic image. More particularly, the generator 27 performs a volume rendering operation by shifting the viewpoint position (the position of a camera) in increments of a predetermined parallax angle with respect to the three-dimensional data that is obtained by combining the three-dimensional pointer, the placement of which is determined by the determiner 25 and the attribute information of which is changed by the changer 26, and the three-dimensional data including the target for viewing as acquired by the first acquirer 23; and generates a plurality of (three or more) parallax images.

Meanwhile, when the receiver 22 has not received a three-dimensional value in the three-dimensional data coordinate system (i.e., when the viewer has not performed an operation to indicate the real space on the near side of the screen using an pointer), neither the operation to be performed by the determiner 25 (i.e., the operation of determining the placement the three-dimensional pointer) nor the operation to be performed by the changer 26 (i.e., the operation of changing attribute information of the three-dimensional pointer) are performed. In that case, for example, the generator 27 can perform the volume rendering operation with respect to only the three-dimensional data including the target for viewing as acquired by the first acquirer 23 and accordingly generate a plurality of parallax images.

The display controller 28 performs control to display a stereoscopic image, which includes a plurality of parallax images generated by the generator 27, on the display 30.

In the embodiment, as illustrated in FIG. 10, when the viewer indicates a position in the real space on the near side of the screen (i.e., points a position) using the pen while looking at the stereoscopic image being displayed on the display 30; the three-dimensional pointer, which includes the first 3D shape formed corresponding to the indicated position and the second 3D shape formed around the first 3D shape, is displayed in a stereoscopic manner. Moreover, for example, if calibration is performed to match the display position of the stereoscopically-displayed three-dimensional pointer so the coordinate system in the real space, it also becomes possible to enhance the sense of coherence between the display and the operations.

Explained below with reference to FIG. 11 is an example of operations performed in the image processor 20 according to the embodiment. FIG. 11 is a flowchart for explaining an example of operations performed in the image processor 20. Herein, it is assumed that the first acquirer 23 has acquired the three-dimensional data including the target for viewing, and the second acquirer 24 has acquired the three-dimensional pointer. As illustrated in FIG. 11, firstly, the converter 21 obtains a three-dimensional coordinate value in the real space from the sensor 10 (Step S101). Then, the converter 21 converts the three-dimensional coordinate value, which is acquired from the sensor 10, into a three-dimensional coordinate value in the three-dimensional data coordinate system (Step S102), and inputs the post-conversion three-dimensional coordinate to the receiver 22. Thus, the receiver 22 receives the three-dimensional coordinate value (the post-conversion three-dimensional coordinate value) from the converter 21 (Step S103).

According to the three-dimensional coordinate value received at Step S103, the determiner 25 determines the placement of the three-dimensional pointer acquired by the second acquirer 24 (Step S104). As described above, the determiner 25 determines the placement of the three-dimensional pointer in such a way that the first 3D shape included in the three-dimensional pointer is positioned at the three-dimensional coordinate value received at Step S103. Then, according to the information (such as the voxel values) of the three-dimensional data corresponding to the three-dimensional coordinate value received at Step S103, the changer 26 changes the attribute information of the three-dimensional pointer acquired by the second acquirer 24 (Step S105).

Subsequently, the generator 27 performs a volume rendering operation with respect to the three-dimensional data that is obtained by combining the three-dimensional pointer, the placement of which is determined at Step S104 and the attribute information of which is changed at Step S105, and the three-dimensional data including the target for viewing as acquired by the first acquirer 23 (Step S106). As a result, a plurality of parallax images gets generated. Then, the display controller 28 performs control to display a stereoscopic image, which includes a plurality of generated parallax images, on the display 30 (Step S107).

As described above, in the embodiment, in the three-dimensional data coordinate system, the three-dimensional pointer that includes the first 3D shape, which is formed at the three-dimensional coordinate value corresponding to the position in the real space indicated by the viewer, and the second 3D shape, which is formed around the first 3D shape, is subjected to rendering along with the three-dimensional data including the target for viewing. With that, it becomes possible to accurately express the pointing position (i.e., the position indicated by the three-dimensional pointer) and the relationship of the pointing position with the surrounding structure. Particularly, since the three-dimensional pointer includes the second 3D shape, it becomes easier for the viewer to understand the relative positional relationship (the anteroposterior relationship) between the surrounding structure, such as tumors or blood vessels, and the three-dimensional pointer. As a result, the viewer can accurately figure out the pointing position.

Figure 12:
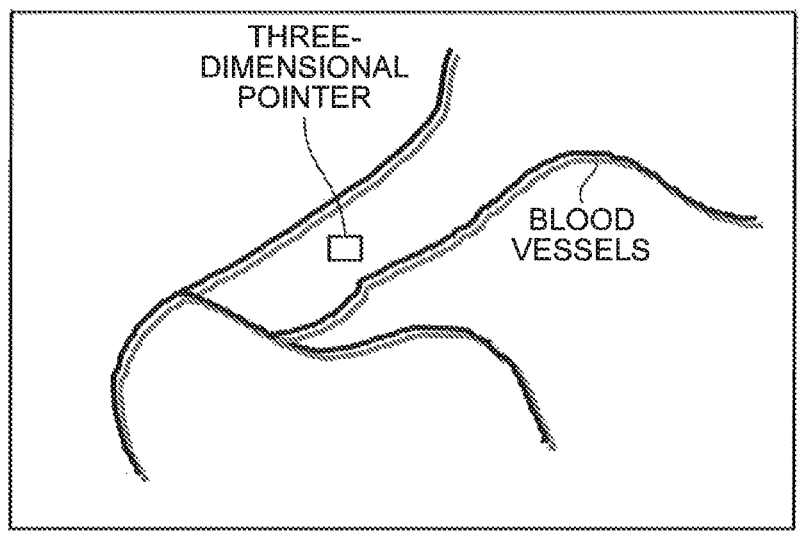
FIG. 12 is a diagram illustrating an example of an image that is obtained by per rendering according to a comparison example.

As a comparison example, assume that, for example, the three-dimensional pointer includes only the first 3D shape. For example, in the comparison example, when an image illustrated in FIG. 12 represents the image obtained by performing rendering; then it is difficult to figure out the pointing position.

Figure 13:
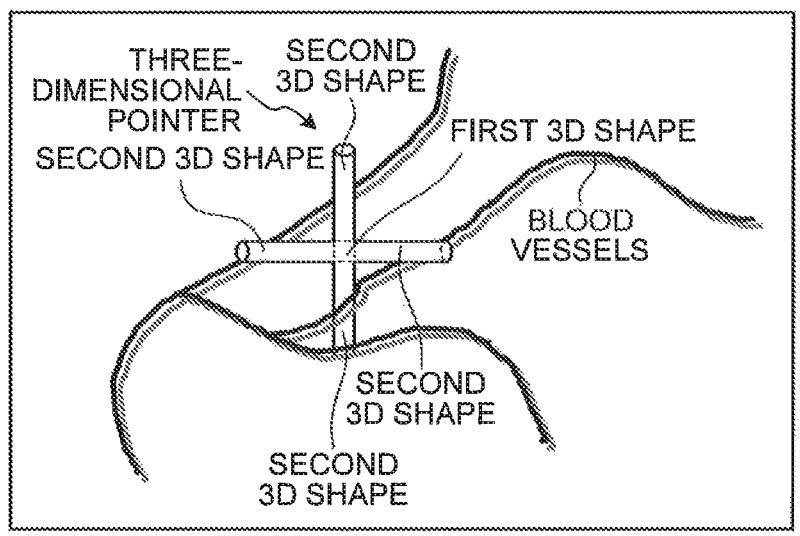
FIG. 13 is a diagram illustrating an example of an image that is obtained by performing rendering according to the embodiment.

In contrast, in the embodiment, the three-dimensional pointer not only includes the first 3D shape that is formed at the position indicated by the viewer, but also includes the second 3D shape that is formed around the first 3D shape. For example, in the embodiment, assume that an image illustrated in FIG. 13 represents the image obtained by performing rendering. As illustrated in FIG. 13, the three-dimensional pointer, not only includes the first 3D shape but also includes the second 3D shape that is made of columnar three-dimensional data extending in a cross-shaped manner around the first 3D shape. Hence, it becomes easier for the user to understand the anteroposterior relationship between "blood vessels" as the surrounding structure and the three-dimensional pointer. As a result, it becomes possible to achieve a beneficial effect that the pointing position can be figured out in an accurate and easy manner.

Meanwhile, as described earlier, the second 3D shape can be of an arbitrary shape. Thus, as long as the shape of the second 3D shape assists in the depth perception in the display relationship with the surrounding structure, it serves the purpose.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. Accompanying claims and their equivalents are intended to cover such forms or modifications as would fall within the scope and spirit of the inventions.

Modifications

Given, below is the explanation, of modifications. Herein, the modifications described below can be combined in an arbitrary manner. Moreover, the modifications described below and the embodiment described above can be combined in an arbitrary manner.

First Modification

For example, thereon configuration can be such that the second 3D shape can have the shape that surrounds the outside of the first 3D shape around the first 3D shape. More particularly, the first 3D shape is a small sphere and the second 3D shape is a ring-like circular or rectangular.

Figure 14A:
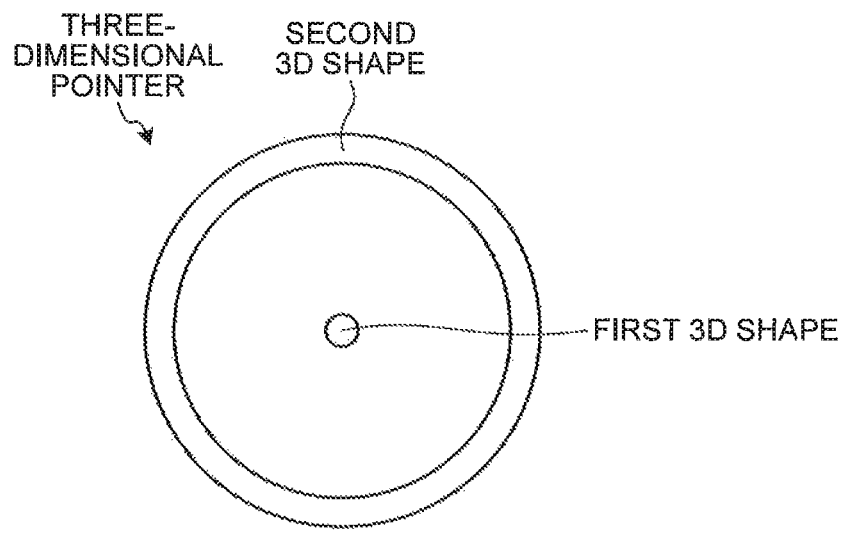
FIG. 14A is a diagram illustrating an example of the three-dimensional pointer.

For example, as illustrated in FIG. 14A, the configuration can be such that the three-dimensional pointer includes the first 3D shape made up of small spherical three-dimensional data and includes the second 3D shape made up of ring-like circular three-dimensional data around the first 3D shape. Similarly as illustrated in FIG. 14B, the configuration can be such that the three-dimensional pointer includes the first 3D shape made up of small spherical three-dimensional data and includes the second 3D shape made up of ring-like rectangular three-dimensional data around the first 3D shape.

Figure 14B:
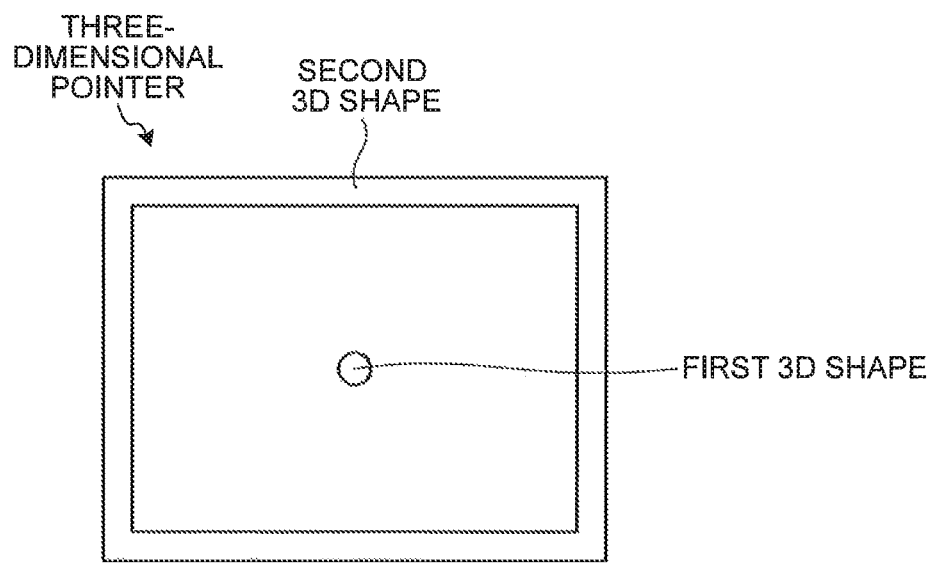
FIG. 14B is a diagram illustrating another example of the three-dimensional pointer.

In essence, as long as the second 3D shape has the shape extending in at least two different direction around the first 3D shape as described in the embodiment or has the shape surrounding the outside of the first 3D shape around the first 3D shape as illustrated in FIGS. 14A and 14B; it serves the purpose.

Second Modification

Figure 15A:
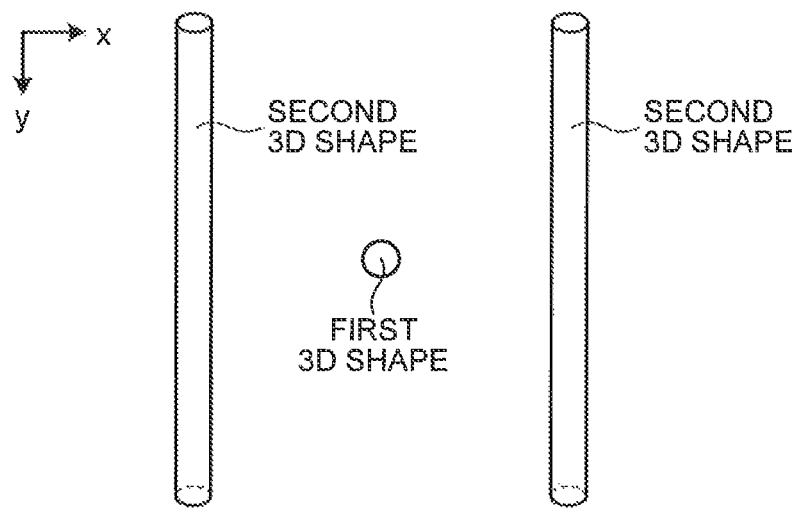
FIG. 15A is a diagram illustrating still another example of the three-dimensional pointer.

For example, as illustrated in FIG. 15A, the configuration can be such that the three-dimensional pointer includes the first 3D shape made up of small spherical three-dimensional data and includes the second 3D shape made up of two sets of columnar three-dimensional data (in this example, cylindrical three-dimensional data) extending in the y-direction in a symmetrical manner around the first 3D shape.

Figure 15B:
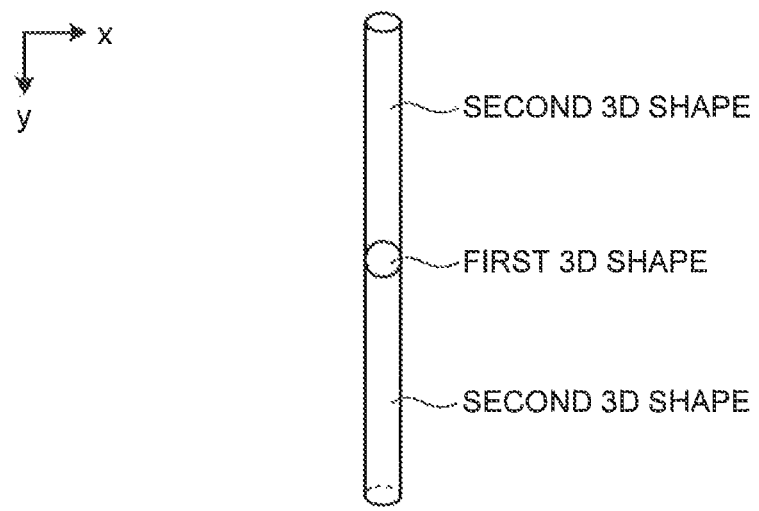
FIG. 15B is a diagram illustrating vet still another example of the three-dimensional pointer.

Alternatively, as illustrated in FIG. 15B, the configuration can be such that the three-dimensional pointer includes the first 3D shape, which is positioned corresponding to the center of the columnar three-dimensional data extending in the y-direction and which is made up of small spherical three-dimensional data, and includes the second 3D shape, which indicates a region in the columnar three-dimensional data other than region corresponding to the first 3D shape.

In essence, as long as the three-dimensional pointer includes the first 3D shape and includes the second 3D shape that is positioned around the first 3D shape; it serves the purpose.

Third Modification

For example, the three-dimensional data can be in the form of polygon data made up of points and with lines and faces made of the sets of points. For example, the changer 26 can perform an inside-outside determination to determine whether or not the three-dimensional coordinate value received by the receiver 22 is included within the closed domain of the polygon data. If it is determined that the three-dimensional coordinate value received by the receiver 22 is included within the closed domain of the polygon data, then the changer 26 can make a change so as to extend the columnar portions of the three-dimensional pointer so that the three-dimensional pointer does not remain completely hidden. Meanwhile, instead of performing the inside-outside determination, the changer 26 can obtain the result of the inside-outside determination from the outside.

Fourth Modification

For example, the three-dimensional data can be in the form of depth data (a depth map) that indicates the depth value of each pixel of two-dimensional images. For example, the changer 26 compares the depth value z indicated in the three-dimensional coordinate value (x, y, z), which is received by the receiver 22, with the depth value corresponding to the position (x, y) of the three-dimensional coordinate value (x, y, z) received by the receiver 22. If the three-dimensional coordinate value z received by the receiver 22 is present on the near side as compared to the depth map, then the changer 26 can make a change so as to increase the degree of transparency of the three-dimensional pointer.

Fifth Modification

In the embodiment described above, the three-dimensional position in the three-dimensional data coordinate system (i.e., the three-dimensional position of the three-dimensional pointer) is input in response to an operation of a pen performed by the viewer. However, that is not the only possible case. Alternatively, the three-dimensional position in the three-dimensional data coordinate system can be input by means of an arbitrary method.

For example, in an initial state (i.e., in a default state before a user performs an operation), the input value of the three-dimensional position in the three-dimensional data coordinate system can be set to the center (the position of the center of gravity) of the three-dimensional data including the target for viewing. In this example, in the default state, on the display 30 is displayed a stereoscopic image that is obtained by performing rendering of the three-dimensional pointer, in which the first 3D shape is positioned at the center of the three-dimensional data including the target for viewing, and the three-dimensional data including the target for viewing. Then, the configuration can be such that the three-dimensional position in the three-dimensional data coordinate system (i.e., the three-dimensional position of the three-dimensional pointer) changes according to the amount of mouse operations performed by the viewer (for example, according to the amount of mouse movement or the amount of wheel movement).

Figure 16:
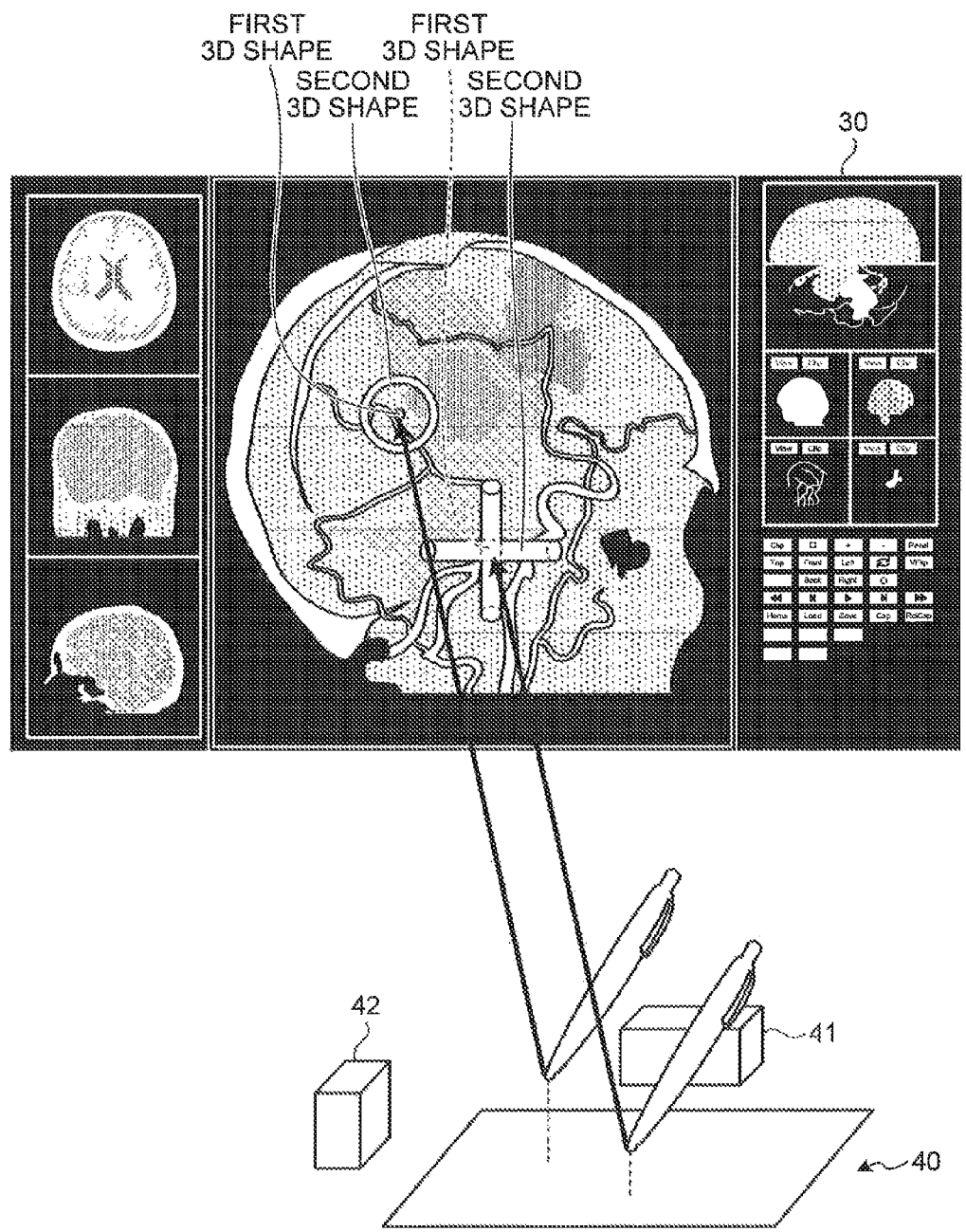
FIG. 16 is a diagram illustrating a display example of a stereoscopic image.

Moreover, in the embodiment described above, the three-dimensional data coordinate system is associated to the coordinate system of the real space on the near side of the screen. However, that is not the only possible case. Alternatively, for example, the three-dimensional data coordinate system can be associated to the coordinate system of the real space at hand of the viewer. In such a configuration, for example, as illustrated in FIG. 16, an input device 40 is disposed that includes sensors 41 and 42 for the purpose of detecting the position (the three-dimensional coordinate value) of the pen in the real space at hand of the viewer. The three-dimensional coordinate value of the pen that is detected by the sensors 41 and 42 is then sent to the image processor 20 and is converted into the three-dimensional coordinate value in the three-dimensional data coordinate system. Then, in an identical manner to the embodiment described above, on the display 30 is displayed a stereoscopic image that is obtained by performing rendering of the three-dimensional pointer, in which the first 3D shape is positioned at the three-dimensional coordinate value obtained by conversion and in which the second 3D shape that is positioned around the first 3D shape, and the three-dimensional data including the target for viewing.

In essence, as long as the three-dimensional position in the three-dimensional data coordinate, system is input in response to an operation of the viewer, it serves the purpose.

Sixth Modification

In the embodiment described above, the explanation is given about an example in which an unaided-eye-type 3D display is used as the stereoscopic image display device in which the invention is implemented. However, alternatively, it is also possible to use a glasses-type 3D display as the stereoscopic image display device in which the invention is implemented.

Seventh Modification

For example, the image processor 20 can be configured to not include the changer 26.

Computer Programs

Meanwhile, the computer programs executed in the image processor 20 can be saved as downloadable files on a computer connected to the Internet or can be made available for distribution through a network such as the Internet. Still alternatively, the computer programs executed in the image processor 20 may be stored in advance in a nonvolatile storage medium such as a ROM and provided, as a computer program product.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing device, comprising a processor configured to:
   convert a three-dimensional position in a real space as indicated by a pointer into a three-dimensional position in a coordinate system of three-dimensional medical data including an object of a subject;
   receive the three-dimensional position converted by the processor;
   determine placement of a three-dimensional pointer having a first 3D shape and a second 3D shape positioned around the first 3D shape so that a position of the first 3D shape corresponds to the received three-dimensional position; and
   generate a stereoscopic image representing the three-dimensional pointer and the object, wherein the processor further changes a color of the three-dimensional pointer to a different color than a color indicated by a value of a voxel that is a part of the object corresponding to the received three-dimensional position.

2. The device according to claim 1, wherein the processor generates the stereoscopic image by rendering the three-dimensional pointer and the three-dimensional medical data.

3. The device according to claim 1, wherein the second 3D shape has a shape that extends in at least two different directions around the first 3D shape or has a shape that surrounds outside of the first 3D shape around the first 3D shape.

4. The device according to claim 3, wherein
the three-dimensional pointer is made up of a plurality of sets of three-dimensional medical data representing respective columns,
the first 3D shape is a region that includes the center of gravity of each of the columns and that is a region having intersection of the columns, and
the second 3D shape is a region other than the first 3D shape.

5. The device according to claim 3, wherein the first 3D shape is a small sphere, and the second 3D shape is a ring-like circle or rectangle.

6. The device according to claim 1, wherein the pointer is a pen input device to input the three-dimensional position in the real space.

7. The device according to claim 1, wherein, when the voxel that corresponds to the received three-dimensional position is included in a voxel group constituting a predetermined organization, the processor further extends the second 3D shape of the three-dimensional pointer.

8. The device according to claim 1, wherein, when the voxel that corresponds to the received three-dimensional position is positioned on a side of a viewer, the processor further increases the degree of transparency of the three-dimensional pointer.

9. An image processing method, comprising:
converting a three-dimensional position in a real space as indicated by a pointer into a three-dimensional position in a coordinate system of three-dimensional medical data including an object of a subject;
receiving the converted three-dimensional position;
determining placement of a three-dimensional pointer having a first 3D shape and a second 3D shape positioned around the first 3D shape so that a position of the first 3D shape corresponds to the received three-dimensional position; and
generating a stereoscopic image representing the three-dimensional pointer and the object, wherein
the method further comprises changing a color of the three-dimensional pointer to a different color than a color indicated by a value of a voxel that is a part of the object corresponding to the received three-dimensional position.

10. The method according to claim 9, further comprising:
in the generating, generating the stereographic image by rendering the three-dimensional pointer and the three-dimensional medical data.

11. The method according to claim 9, wherein the second 3D shape has a shape that extends in at least two different directions around the first 3D shape or has a shape that surrounds outside of the first 3D shape around the first 3D shape.

12. The method according to claim 11, wherein
the three-dimensional pointer is made up of a plurality of sets of three-dimensional medical data representing respective columns,
the first 3D shape is a region that includes the center of gravity of each of the columns and that is a regional having intersection of the columns, and
the second 3D shape is a region other than the first 3D shape.

13. The method according to claim 11, wherein the first 3D shape is a small sphere, and the second 3D shape is a ring-like circle or rectangle.

14. The method according to claim 9, wherein, when the voxel that corresponds to the received three-dimensional position is included in a voxel group constituting a predetermined organization, the method further comprises extending the second 3D shape of the three-dimensional pointer.

15. The method according to claim 9, wherein, when the voxel that corresponds to the received three-dimensional position is positioned on a side of a viewer, the method further comprises increasing the degree of transparency of the three-dimensional pointer.

* * * * *

UNITED STATES PATENT AND TRADEMARK OFFICE
CERTIFICATE OF CORRECTION

PATENT NO. : 9,760,263 B2
APPLICATION NO. : 14/191755
DATED : September 12, 2017
INVENTOR(S) : Tomoyuki Takeguchi et al.

Page 1 of 1

It is certified that error appears in the above-identified patent and that said Letters Patent is hereby corrected as shown below:

On the Title Page

Item (71), in the Applicant, change "KABUSHIKI KAISHA TOSHIBA, Tokyo (JP)" to --TOSHIBA MEDICAL SYSTEMS CORPORATION, Otawara-shi (JP)--.

Item (73), in the Assignee, Line 2, change "Tokyo (JP)" to --Otawara-shi (JP)--.

In the Claims

Claim 12, Column 14, Lines 27-28, change "and that is a regional having" to --and that is a region having--.

Signed and Sealed this
Nineteenth Day of December, 2017

Joseph Matal
*Performing the Functions and Duties of the
Under Secretary of Commerce for Intellectual Property and
Director of the United States Patent and Trademark Office*